(12) United States Patent
Ban et al.

(10) Patent No.: US 12,524,382 B2
(45) Date of Patent: Jan. 13, 2026

(54) SYSTEMS AND METHODS FOR CONVERTING DATA TYPES IN DATA MIGRATION

(71) Applicant: The Toronto-Dominion Bank, Toronto (CA)

(72) Inventors: Avinash Ban, Mississauga (CA); Margot Shepherd-Spurgeon, Hamilton (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/506,614

(22) Filed: Nov. 10, 2023

(65) Prior Publication Data
US 2025/0156381 A1    May 15, 2025

(51) Int. Cl.
  *G06F 16/21* (2019.01)
  *G06F 16/25* (2019.01)
(52) U.S. Cl.
  CPC .......... *G06F 16/214* (2019.01); *G06F 16/258* (2019.01)
(58) Field of Classification Search
  None
  See application file for complete search history.

(56) References Cited

U.S. PATENT DOCUMENTS

| | | | |
|---|---|---|---|
| 6,151,608 A | | 11/2000 | Abrams |
| 6,996,589 B1 * | | 2/2006 | Jayaram ................ G06F 16/258 |
| 9,092,502 B1 | | 7/2015 | Cannaliato |
| 9,430,505 B2 | | 8/2016 | Padmanabhan |
| 10,185,727 B1 * | | 1/2019 | Wilton .................. G06F 16/214 |
| 10,740,286 B1 * | | 8/2020 | Gilderman ............ G06F 9/5038 |
| 10,965,742 B2 | | 3/2021 | Dennis |
| 11,016,954 B1 * | | 5/2021 | Babocichin ........... G06F 16/258 |
| 11,025,598 B1 * | | 6/2021 | Laghaeian .......... H04L 63/0435 |
| 11,269,824 B1 | | 3/2022 | Waas |
| 11,467,752 B2 | | 10/2022 | Okoshi |
| 11,615,061 B1 * | | 3/2023 | Malik ................... G06F 16/214 |
| | | | 707/602 |
| 11,914,610 B1 * | | 2/2024 | Bekelman ............. G06F 16/258 |

(Continued)

FOREIGN PATENT DOCUMENTS

| CN | 102831211 | 12/2012 |
|---|---|---|
| CN | 114860694 | 8/2022 |

(Continued)

*Primary Examiner* — Christopher J Raab
(74) *Attorney, Agent, or Firm* — Marks & Clerk; Paul Horbal; Wilfred P. So

(57) ABSTRACT

Systems and methods for migrating data are provided. A migration application communicates with a source database and a target database, and receives a command to migrate data therebetween. It automatically detects that, for a source data field in the source database that is to be migrated to a target data field in the target database, the source data field is of a first data type and the target data field is of a second data type that is different from the first data type. The migration application automatically searches a rules database for a conversion rule in relation to the first data type and the second data type. The migration application automatically executes the conversion rule to convert data in the source data field to converted data that is of the second data type. The migration application automatically migrates the converted data to the target database.

18 Claims, 6 Drawing Sheets

(56) References Cited

U.S. PATENT DOCUMENTS

| | | | |
|---|---|---|---|
| 2012/0265726 A1* | 10/2012 | Padmanabhan | G06F 16/214 |
| | | | 707/602 |
| 2015/0347542 A1* | 12/2015 | Sullivan | G06F 9/5072 |
| | | | 707/602 |
| 2016/0063050 A1* | 3/2016 | Schoen | G06F 16/214 |
| | | | 707/690 |
| 2018/0246886 A1* | 8/2018 | Dragomirescu | G06F 16/2379 |
| 2020/0167323 A1* | 5/2020 | Swamy | G06F 16/256 |
| 2020/0311095 A1 | 10/2020 | Gorshtein | |
| 2021/0294858 A1* | 9/2021 | Kondiles | G06F 16/24532 |
| 2021/0389976 A1* | 12/2021 | Haq | G06F 16/214 |
| 2022/0358101 A1* | 11/2022 | Medisetti | G06F 16/275 |
| 2023/0144349 A1 | 5/2023 | Kodavati | |

FOREIGN PATENT DOCUMENTS

| | | |
|---|---|---|
| CN | 115617773 | 1/2023 |
| CN | 115934681 | 4/2023 |

* cited by examiner

SYSTEMS AND METHODS FOR CONVERTING DATA TYPES IN DATA MIGRATION

TECHNICAL FIELD

The disclosed exemplary embodiments relate to computer-implemented systems and methods for automatically converting data types during data migration.

BACKGROUND

Migrating data between different databases may cause difficulty when the types of databases are different such as, for example, when source and target data fields in the databases have different data types.

Furthermore, the challenges of data migration become more difficult when migrating data from a private on-premise ("OnPrem") computing environment to a public cloud computing environment. Existing data migration tools may not have been developed with security in mind and, in some cases, are suited primarily for like-to-like (e.g., OnPrem-to-OnPrem) data migration and not for migrating to a public cloud computing environment. Furthermore, operators in many cases install additional devices and software to facilitate data migration. Operators also often manually intervene to correct or pre-process the data before migrating the data, due to the different data types between the different databases.

SUMMARY

The following summary is intended to introduce the reader to various aspects of the detailed description, but not to define or delimit any invention.

In at least one broad aspect, there is provided a system for migrating data, the system comprising: a memory, a network interface, and a processor, the processor operably coupled to the memory and the network interface. The processor is configured to: receive a command to migrate data from a source database to a target database; automatically detect that, for a source data field in the source database that is to be migrated to a target data field in the target database, the source data field is of a first data type and the target data field is of a second data type that is different from the first data type; automatically search a rules database in the memory for a conversion rule in relation to the first data type and the second data type; after obtaining the conversion rule, automatically execute the conversion rule to convert data in the source data field to converted data that is of the second data type; and, automatically migrate the data from the source database, including the converted data, to the target database.

In some cases, the system is part of a public cloud computing system, the target database resides on the public cloud computing system, and the source database resides on an on-premise computing system.

In some cases, the system comprises a virtual machine operating on the memory, the network interface and the processor of the public cloud computing system, and the virtual machine is configured to run a Java batch program for migrating the data.

In some cases, the system communicates with the source database using a Java Database Connectivity connection.

In some cases, the processor is further configured to: detect a plurality of source tables in the source database; create a plurality of data migration threads respectively corresponding to the plurality of source tables for transferring the data to a plurality of target tables in the target database; and, prior to executing each of the plurality of data migration threads, automatically determine for each of the plurality of source tables if there is at least a given source data field in a given source table that has a different data type compared to a corresponding given target data field in a corresponding given target table.

In some cases, the plurality of data migration threads are executed in parallel to simultaneously transfer the data from the plurality of source tables to the plurality of target tables.

In some cases, the memory stores therein an encrypted database vault, the encrypted database vault storing in an encrypted format at least a source user ID and a source password for accessing the source database, and a target user ID and a target password for accessing the target database; and, after receiving the command, the processor is further configured to access the encrypted database to use the source user ID and the source password to access the source database, and to use the target user ID and the target password to access the target database.

In some cases, the system is part of an on-premise computing system, the target database resides on the on-premise computing system, and the source database resides on the on-premise computing system.

In some cases, the memory stores thereon a scheduled date, and the processor is further configured to automatically migrate the data from the source database, including the converted data, to the target database on the scheduled date.

In some cases, the first data type is a first data format, and the second data type is a second data format; and the processor is further configured to: automatically detect that the first data format is not supported by the second target database; and automatically convert the first data format to the second data format according to according to the conversion rule.

In at least another broad aspect, a method for migrating data is provided. The method is executed in a computing environment comprising one or more processors and memory, the method comprising: receiving a command to migrate data from a source database to a target database; automatically detecting that, for a source data field in the source database that is to be migrated to a target data field in the target database, the source data field is of a first data type and the target data field is of a second data type that is different from the first data type; automatically searching a rules database in the memory for a conversion rule in relation to the first data type and the second data type; after obtaining the conversion rule, automatically executing the conversion rule to convert data in the source data field to converted data that is of the second data type; and, automatically migrating the data from the source database, including the converted data, to the target database.

In some cases, the computing environment is a public cloud computing system, the target database resides on the public cloud computing system, and the source database resides on an on-premise computing system.

In some cases, the computing environment comprises a virtual machine operating on the memory, the network interface and the one or more processors of the public cloud computing system, and the virtual machine is configured to run a Java batch program for executing the method.

In some cases, the method further comprises: detecting a plurality of source tables in the source database; creating a plurality of data migration threads respectively corresponding to the plurality of source tables for transferring the data to a plurality of target tables in the target database; and, prior to executing each of the plurality of data migration threads, automatically determining for each of the plurality of source tables if there is at least a given source data field in a given source table that has a different data type compared to a corresponding given target data field in a corresponding given target table.

In some cases, the plurality of data migration threads are executed in parallel to simultaneously transfer the data from the plurality of source tables to the plurality of target tables.

In some cases, the memory stores therein an encrypted database vault, the encrypted database vault storing in an encrypted format at least a source user ID and a source password for accessing the source database, and a target user ID and a target password for accessing the target database; and, after receiving the command, the method further comprising accessing the encrypted database to use the source user ID and the source password to access the source database, and to use the target user ID and the target password to access the target database.

In some cases, the computing environment is part of an on-premise computing system, the target database resides on the on-premise computing system, and the source database resides on the on-premise computing system.

In some cases, the memory stores thereon a scheduled date, and the method further comprising automatically migrating the data from the source database, including the converted data, to the target database on the scheduled date.

In some cases, the first data type is a first data format, and the second data type is a second data format; and wherein the method further comprises: automatically detecting that the first data format is not supported by the second target database; and automatically converting the first data format to the second data format according to according to the conversion rule.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Figure 1A:
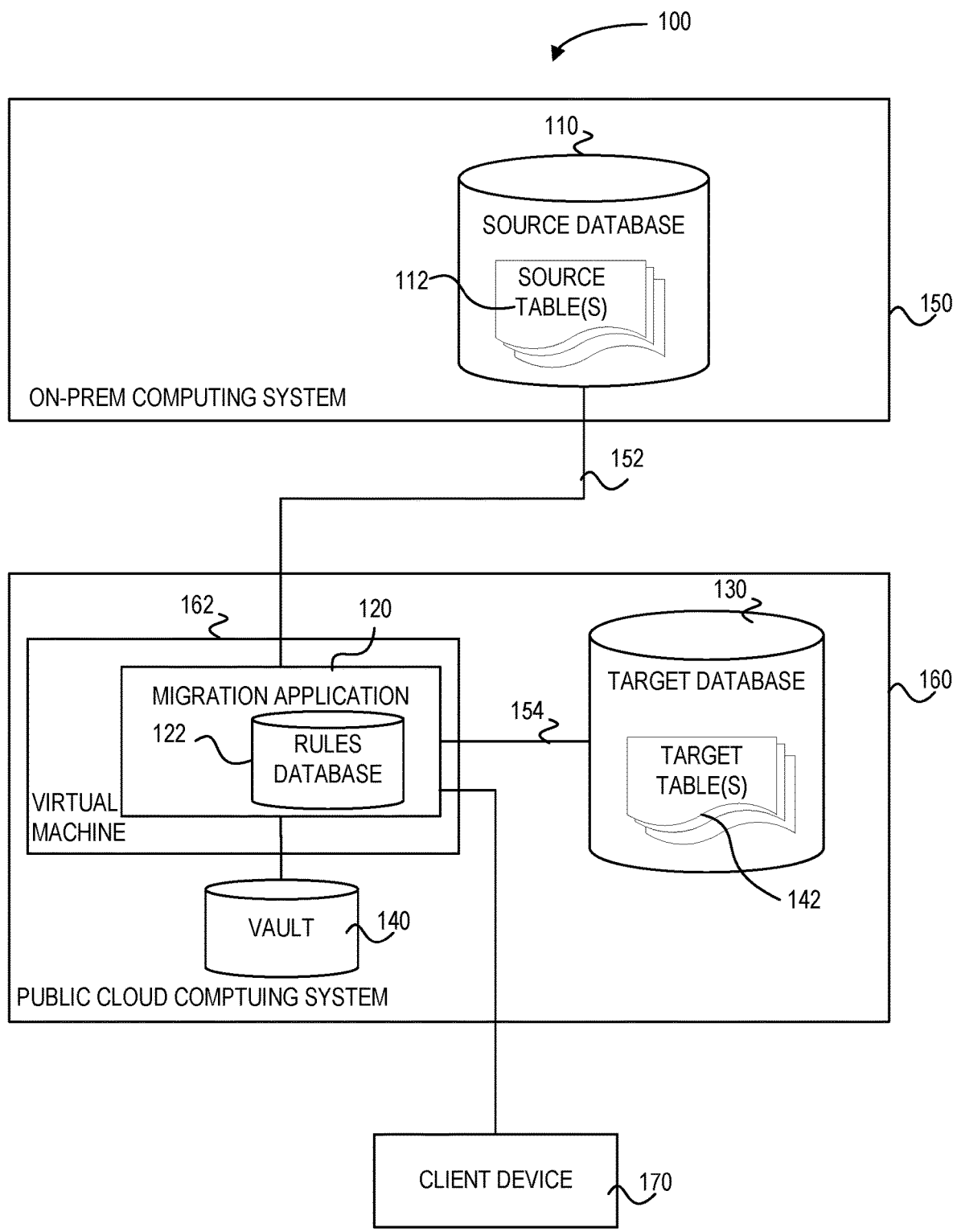
FIG. 1A is a schematic block diagram of a system for migrating data in accordance with at least some embodiments.

In some cases, a migration application to migrate data between different databases, which may have different data field types.

In some cases, a system includes an on-premise ("OnPrem") database, such as an Oracle database, and a public cloud computing environment, such as an Azure™ or AWS™ cloud environment. It may be desirable to migrate data from the OnPrem database to a database in the public cloud computing system. The OnPrem database is referred to as a source database and the database in the public cloud is referred to as a target database. In some cases, a virtual machine in the public cloud computing system runs a migration application to facilitate the data migration. In some cases, the migration application is a Java batch program. The migration application can access the source database and the target database. In some cases, the migration application accesses a vault that stores encrypted login IDs and passwords for accessing the source database and the target database. In some cases, the migration application can implement parallel data migration threads for transferring data from multiple tables in the source database to multiple tables in the target database. The parallel threading saves time. In some cases, the migration application executes the data migration at scheduled times.

In some cases, the migration application is configured to automatically detect differences in data types between a data field in the source database and a data field in the target database and converts the data of the source data field to match the data type of the data field in the target database. The migration application automatically detects the different data types and converts the data type before the data migration takes place. The converted data is migrated and stored in the target database.

For example, the target database does not support certain date formats (e.g., DD-MMM-YY). While migrating data, the Java batch program can identify such data formats in the source database and convert it into target database compatible data formats (e.g., YYYY-MM-DD) without manual intervention.

Furthermore, the source database and the target database may have different types. For example, Oracle, Db2 and SQL databases have some syntax differences which can be identified ahead of time and conversion rules created and stored in the migration application to automate conversion between the different syntaxes.

In some other cases, the migration application is used for data migration between a source database and a target database that are both in an OnPrem computing system. It will be appreciated that the terms "OnPrem" and "on-premise" refer to computers, and software running thereon, that are within a private network, typically within a private or access-controlled data center within the control of the person or organization using the computers and the software. On-premise does not require the computers to be physically within the same location.

In some cases where the migration application is a Java batch program, the Java batch program communicates with the source database using a JDBC (Java Database Connectivity) connection and using AES (Advanced Encryption Standard) 256-encryption.

Referring to FIG. 1A, a system 100 is provided that includes a source database 110, a migration application 120, and a target database 130. In some embodiments, the source database 110 resides and operate in an on-premise computing system 150, and the migration application 120 and the target database 130 reside and operate in a public cloud computing system 160.

In some cases, the source database 110 includes one or more source tables 112. Each source table includes source data fields. The target database 130 includes one or more target tables 142, and each target table includes target data fields. Data from the source data fields are migrated and stored in the target data fields in the target data table. More generally, the migration application 120 automatically migrates data from the source database 110 to the target database 130 and, under certain conditions, converts data from the source database to generate converted data to be stored in the target database.

In some cases, the migration application 120 includes a rules database 122, which stores thereon conversion rules that are executed by the migration application 120. The rules database 122 and the migration application 120 are stored in memory of the public cloud computing system 160.

In some cases, a client device 170 interacts with the migration application to initiate or modify operations of the migration application.

The migration application 120 also accesses an encrypted database vault 140, which stores in an encrypted format at least a source user ID and a source password for accessing the source database, and a target user ID and a target password for accessing the target database. The migration application 120 accesses the encrypted database vault 140 to use the source user ID and the source password to access the source database 110, and to use the target user ID and the target password to access the target database 130.

In some cases, the migration application 120 runs on a virtual machine 162 that operates in the public cloud computing system 160. In particular, the virtual machine 162 utilizes hardware resources of the public cloud computing system, such as a memory, a network interface, and a processor of the public cloud computing system. In some cases, the virtual machine 162 is configured to run a Java batch program for migrating data. For example, the migration application 120 is a Java batch program that is run on the virtual machine 162.

In some cases, the migration application 120 communicates with the source database 110 using a data connection 152 that is a Java Database Connectivity connection.

In some cases, a client device 170 initiates a command in the migration application 120 to migrate data from the source database to the target database. In some cases, the command is associated with a scheduled date and time that is stored in memory of the computing system on which the migration application runs on (e.g., a virtual machine 162 or another type of computing system). In some embodiments, the processor of the same computing system is further configured to automatically migrate the data from the source database, including the converted data, to the target database on the scheduled date.

In some cases, there are a plurality of source tables 112 and the migration application 120 creates a plurality of data migration threads across a data connection 152 between the source database 110 and the migration application 120 and across a data connection 154 between the migration application 120 and the target database 130, whereby the plurality of data migration threads respectively correspond to the plurality of source tables 112 for transferring the data to the plurality of target tables 142 in the target database 130. In some cases, each of the plurality of data migration threads are executed in parallel to simultaneously transfer the data to the plurality of target tables 142.

In some cases, prior to executing each of the plurality of data migration threads, the migration application 120 automatically determines for each of the plurality of source tables 112 if there is at least a given source data field in a given source table that has a different data type compared to a corresponding given target data field in a corresponding given target table amongst the plurality of target tables 142. If so, a conversion rule from the rules database 122 is applied to convert data from the given source data field to a data type of the corresponding given target data field.

In some cases, the source database 110 is a Db2 database server and the source database is a Structured Query Language (SQL) database server 130. In some other cases, other different types of databases for the source database and the target database are used in the system 100.

Figure 1B:
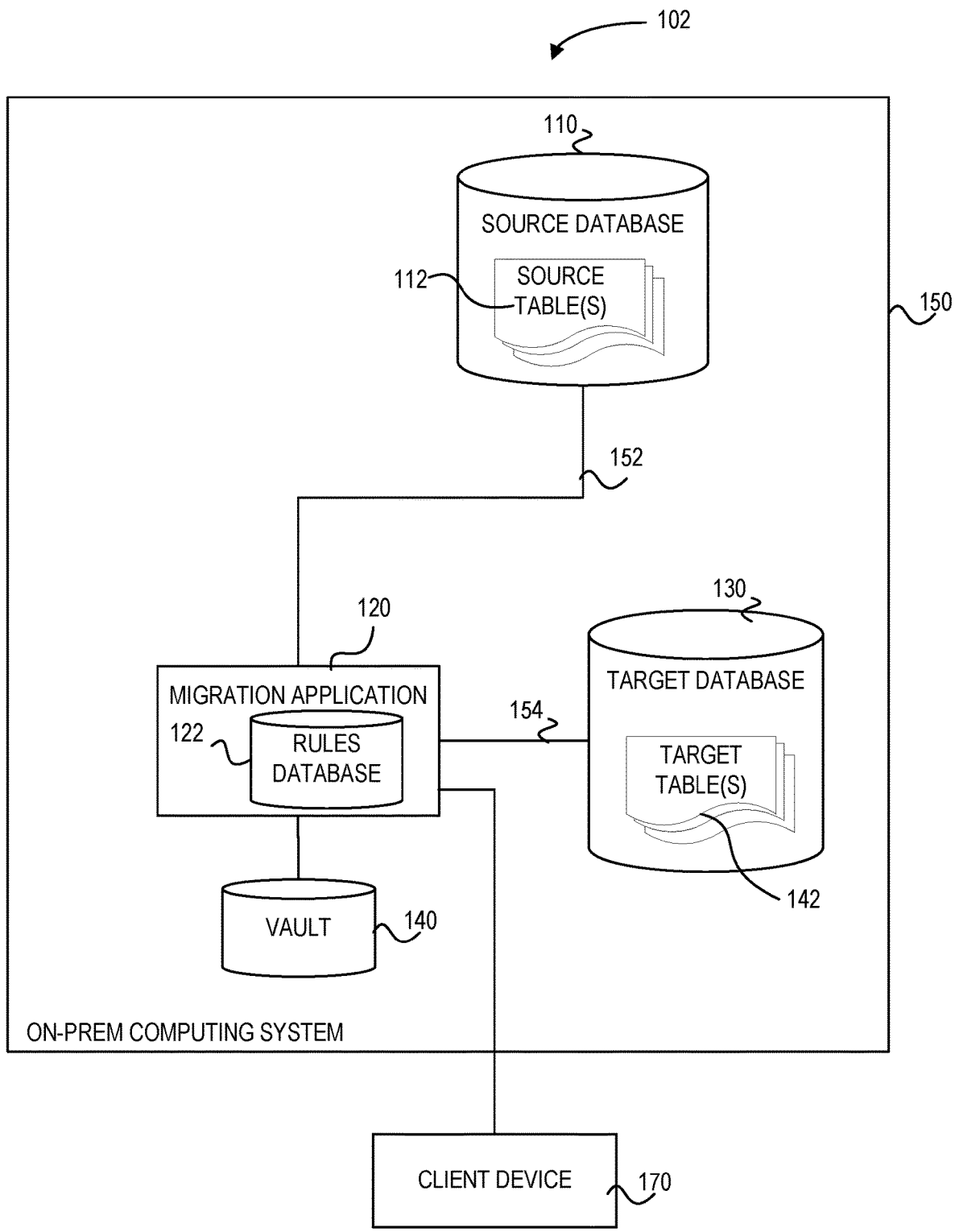
FIG. 1B is a schematic block diagram of an alternative system for migrating data in accordance with at least some embodiments.

Referring to FIG. 1B, in some other cases, a different system 102 is provided that is similar to the system 100. However, the source database 110, the migration application 120 and the target database 130 reside together on the on-premise computing system 150.

Figure 2:
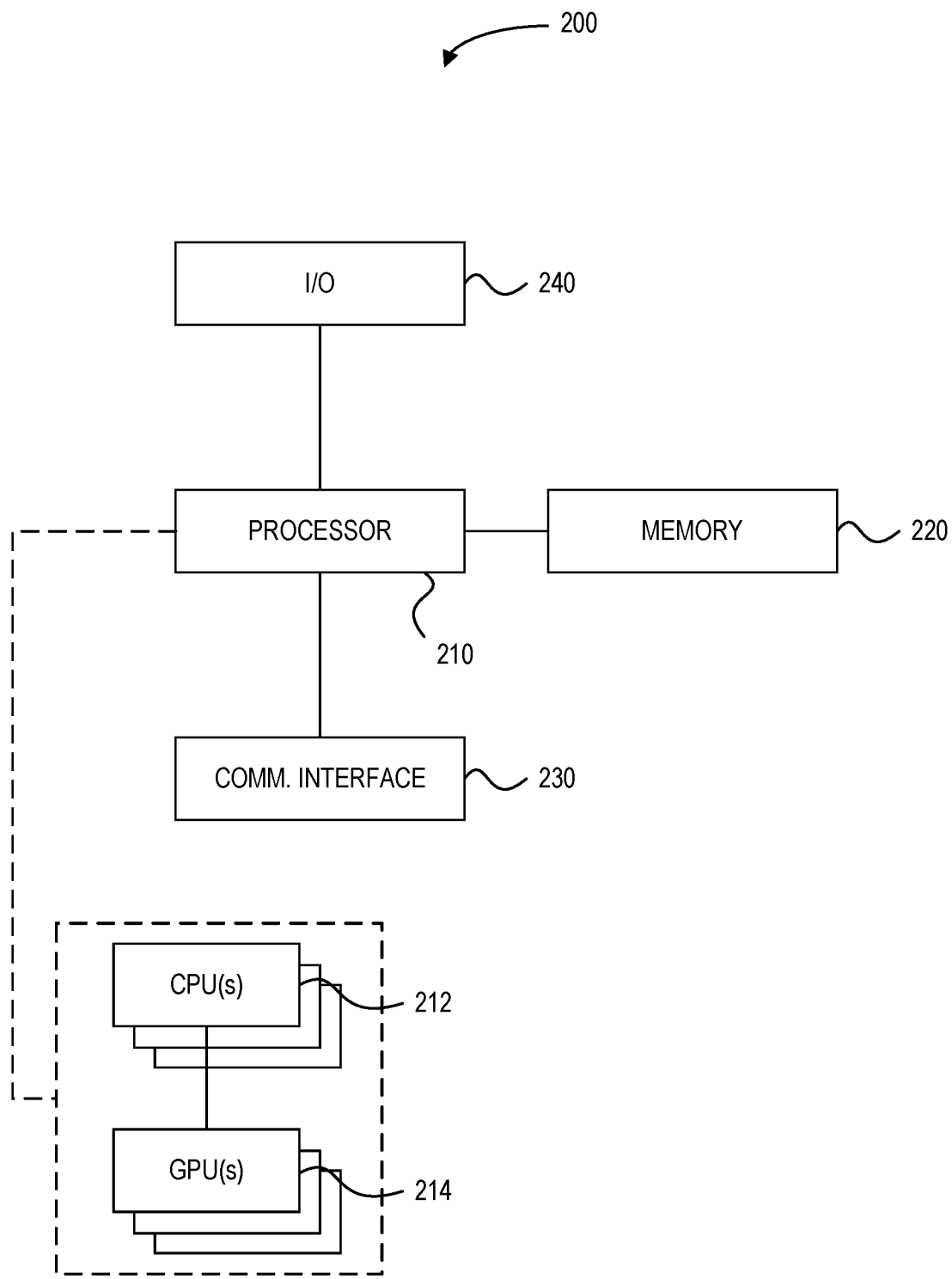
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as the on-premise computing system 150, the public cloud computing system 160, and the client device 170 shown in FIGS. 1A and 1B. Computer 200 has at least one processor 210 operatively coupled to at least one memory 220, at least one communications interface 230 (also herein called a network interface), and at least one input/output device 240. For a client device 170, examples of input/output devices include a display screen, a pointer selection controller (e.g., a mouse or a touch screen, or both), and a keyboard (e.g., a physical keyboard or a touch screen that includes digital keyboard functionality, or both).

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230, and may also transmit or receive data via any additional input/output device 240 as appropriate.

In some cases, the processor 210 includes a system of central processing units (CPUs) 212. In some other cases, the processor includes a system of one or more CPUs and one or more Graphical Processing Units (GPUs) 214 that are coupled together.

Figure 3:
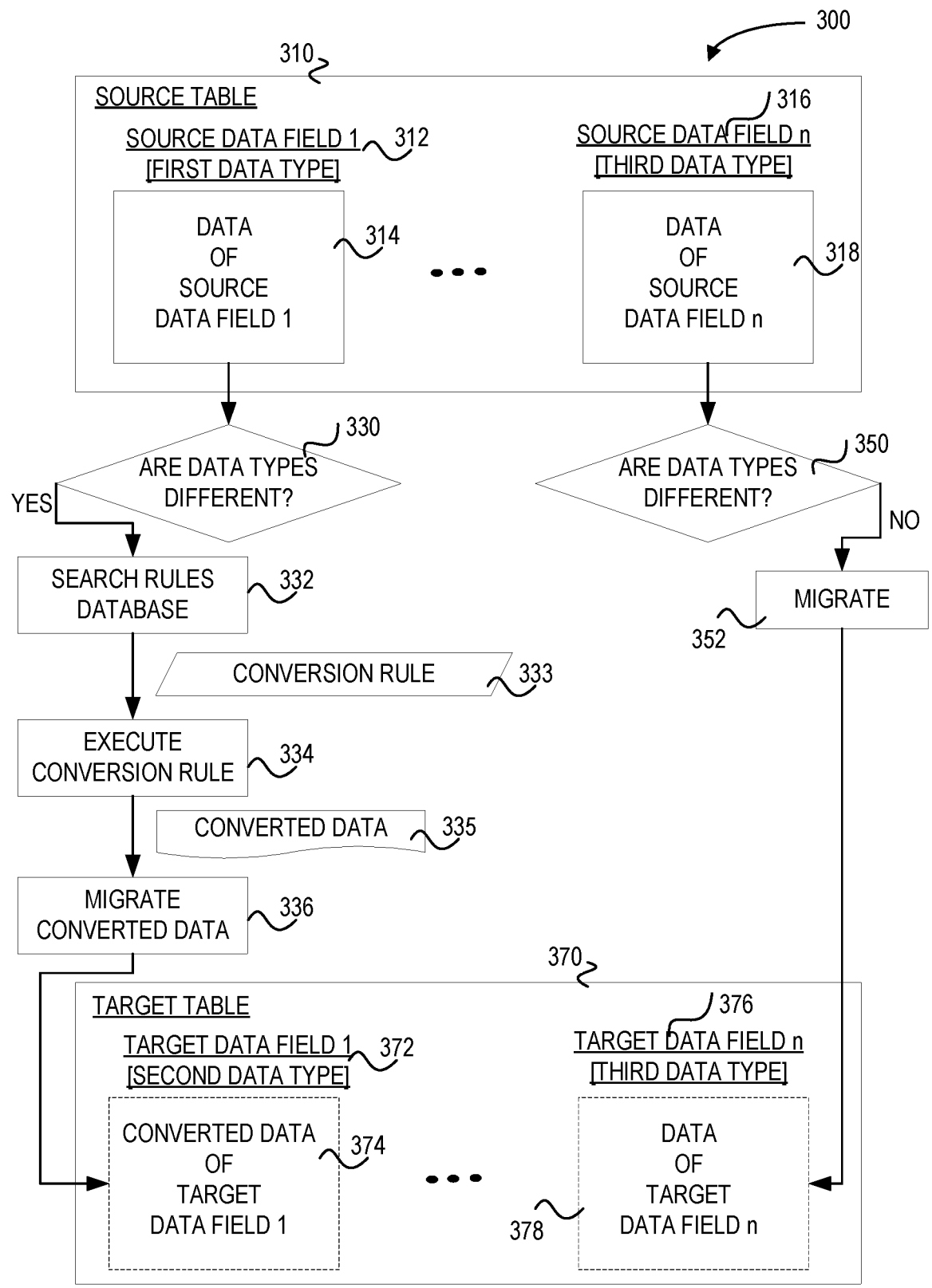
FIG. 3 is a schematic diagram of data components of a source table and a target table, and executable operations for migrating data therebetween, in accordance with at least some embodiments.

Referring now to FIG. 3, an example method 300 is provided that shows a source table 310, which resides in a source database, and a target table 370, which resides in a target database, according to some embodiments. The source table 370 includes multiple source data fields, including a first source data field 312 and an nth source data field 316. Data 314 is stored in the source table in the first source data field 312. The data 314 of the first source data field 312 is of a first data type, and it is designated to be migrated in to a first target data field 372 of a second data type. In this example case, the first data type and the second data type are different from each other. For example, the syntaxes between the data types are different, or the data formats between the data types are different, or some other characteristics between the data types are different. In an example, the data 314 of the first source data field 312 is a numeric data type and the first target data field 372 is a character data type. Other variations of data types are applicable to the principles described herein.

The migration application 120 at block 330 automatically determines if the first data type of the first source data field 312 is different from the second data type of the first target data field 372. Based on automatically detecting that the first data type and the second data type are different, the migration application 120 automatically searches the rules database 122 (block 332) for a conversion rule in relation to the first data type and the second data type.

After finding the conversion rule 333 that is relevant to the first data type and the second data type, the migration application 120 automatically executes the conversion rule 333 (block 334), which converts data 314 for the first data type to converted data 335 of the second data type.

The migration application 120 automatically migrates the converted data 335 to the first target data field 372 in the target table 370 (block 336). The converted data 335 is stored at converted data 374 in the first target data field 372, having the second data type.

In some cases, the migration application automatically detects that automatically detects that the first data format (of the first data type) is not supported by the second target database. The conversion rule identifies a second data format (of a second data type) that is supported by the target database, and the migration tool converts the first data format to the second data format.

In another example case, the nth source data field 316 is of a third data type and has data 318 of the third data type stored in the nth source data field 316. The data 318 is to be migrated to an nth target data field 376, also of the third data type, in the target table 370. The migration application 120 at block 350 determines if the third data type of the nth source data field 316 is different from the third data type of the nth target data field 376. In this case, they are not different, but are the same data types. The migration application 120 migrates the data 318 to the target data field 376 (block 352). The migrated data 378 is stored in the nth target data field 376 in the target data table 370.

Figure 4:
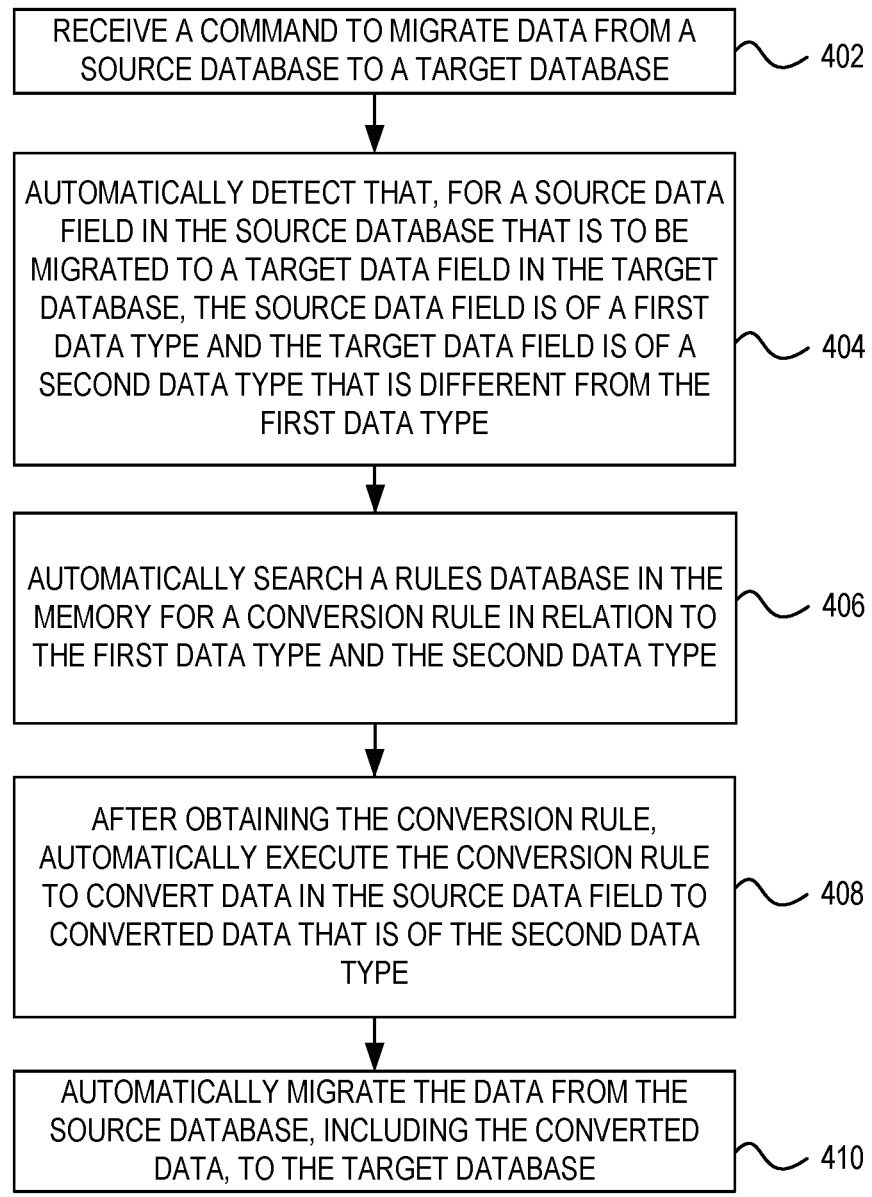
FIG. 4 is a flowchart diagram of an example method of migrating data in accordance with at least some embodiments.

Referring now to FIG. 4, a method 400 is shown for migrating data according to some embodiments.

Block 402: Receive a command to migrate data from a source database to a target database.

Block 404: Automatically detect that, for a source data field in the source database that is to be migrated to a target data field in the target database, the source data field is of a first data type and the target data field is of a second data type that is different from the first data type.

Block 406: Automatically search a rules database in the memory for a conversion rule in relation to the first data type and the second data type.

Block 408: After obtaining the conversion rule, automatically execute the conversion rule to convert data in the source data field to converted data that is of the second data type Block 410: Automatically migrate the data from the source database, including the converted data, to the target database.

Figure 5:
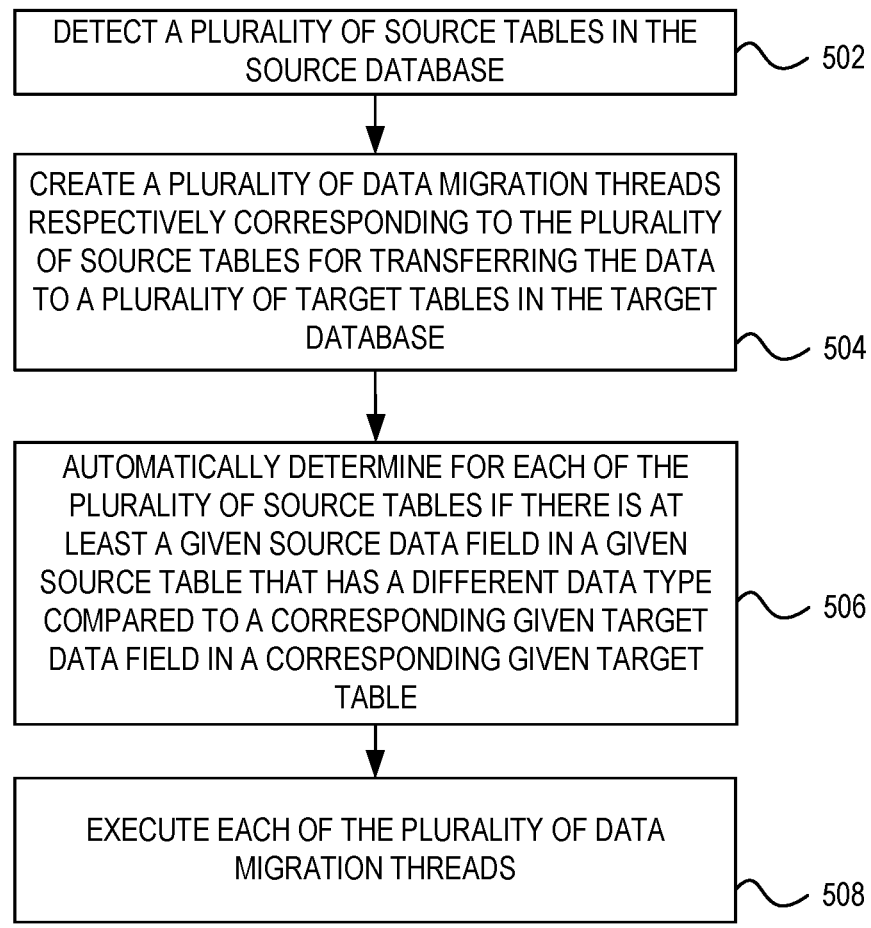
FIG. 5 is a flowchart diagram of an example method of migrating data for a plurality of tables in accordance with at least some embodiments.

Referring now to FIG. 5, a method of migrating data using multiple migration threads is shown according to some embodiments.

Block 502: Detect a plurality of source tables in the source database.

Block 504: Create a plurality of data migration threads respectively corresponding to the plurality of source tables for transferring the data to a plurality of target tables in the target database.

Block 506: Automatically determine for each of the plurality of source tables if there is at least a given source data field in a given source table that has a different data type compared to a corresponding given target data field in a corresponding given target table.

Block 508: Execute each of the plurality of data migration threads. In some cases, the process described in FIG. 4 is applied to each one of the plurality of data migration threads. In some cases, each of the plurality of data migration threads is executed in parallel to simultaneously transfer the data from the plurality of source tables to the plurality of target tables.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about"

which means a variation of up to a certain amount of the number to which reference is being made if the result is not significantly changed.

Some elements herein may be identified by a part number, which is composed of a base number followed by an alphabetical or subscript-numerical suffix (e.g., 112a, or 1121). All elements with a common base number may be referred to collectively or generically using the base number without a suffix (e.g., 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g., a pushbutton keyboard, mouse, a touchscreen, and the like), and at least one output device (e.g., a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A system for migrating data, the system comprising:
a memory, a network interface, and a processor, the processor operably coupled to the memory and the network interface, wherein the memory stores therein an encrypted database vault, the encrypted database vault storing in an encrypted format at least a source user ID and a source password for accessing a source database, and a target user ID and a target password for accessing a target database; and, the processor configured to:
receive a command to migrate data from the source database to the target database;
responsive to receiving the command, access the encrypted database vault to use the source user ID and the source password to access the source database, and to use the target user ID and the target password to access the target database, and then automatically determine if a first data type of a source data field in the source database, which is to be migrated to a target data field in the target database, is different or the same as a second data type of the target data field;
responsive to automatically detecting the first data type is different from the second data type, automatically search a rules database in the memory for a conversion rule in relation to the first data type and the second data type;
after obtaining the conversion rule, automatically execute the conversion rule to convert data in the source data field to converted data that is of the second data type; and,
after automatically executing the conversion rule, automatically migrate the data from the source database, including the converted data, to the target database.

2. The system of claim 1, wherein the system is part of a public cloud computing system, the target database resides on the public cloud computing system, and the source database resides on an on-premise computing system.

3. The system of claim 2, wherein the system comprises a virtual machine operating on the memory, the network interface and the processor of the public cloud computing system, and the virtual machine is configured to run a Java batch program for migrating the data.

4. The system of claim 3, wherein the system communicates with the source database using a Java Database Connectivity connection.

5. The system of claim 1, wherein the processor is further configured to:
detect a plurality of source tables in the source database;
create a plurality of data migration threads respectively corresponding to the plurality of source tables for transferring the data to a plurality of target tables in the target database; and,
prior to executing each of the plurality of data migration threads, automatically determine for each of the plurality of source tables if there is at least a given source data field in a given source table that has a different data type compared to a corresponding given target data field in a corresponding given target table.

6. The system of claim 5, wherein the plurality of data migration threads are executed in parallel to simultaneously transfer the data from the plurality of source tables to the plurality of target tables.

7. The system of claim 1, wherein the system is part of an on-premise computing system, the target database resides on the on-premise computing system, and the source database resides on the on-premise computing system.

8. The system of claim 1, wherein the memory stores thereon a scheduled date, and the processor is further configured to automatically migrate the data from the source database, including the converted data, to the target database on the scheduled date.

9. The system of claim 1, wherein the first data type is a first data format, and the second data type is a second data format; and wherein the processor is further configured to:
automatically detect that the first data format is not supported by the second target database; and
automatically convert the first data format to the second data format according to according to the conversion rule.

10. A method for migrating data, the method executed in a computing environment comprising one or more processors and memory, the method comprising:
storing in the memory an encrypted database vault, the encrypted database vault storing in an encrypted format at least a source user ID and a source password for accessing a source database, and a target user ID and a target password for accessing a target database;
receiving a command to migrate data from the source database to a target database;
responsive to receiving the command, accessing the encrypted database vault to use the source user ID and the source password to access the source database, and to use the target user ID and the target password to access the target database, and then automatically determining if a first data type of a source data field in the source database, which is to be migrated to a target data field in the target database, is different or the same as a second data type of the target data field;
responsive to automatically detecting the first data type is different from the second data type, automatically searching a rules database in the memory for a conversion rule in relation to the first data type and the second data type;
after obtaining the conversion rule, automatically executing the conversion rule to convert data in the source data field to converted data that is of the second data type; and,
after automatically executing the conversion rule, automatically migrating the data from the source database, including the converted data, to the target database.

11. The method of claim 10, wherein the computing environment is a public cloud computing system, the target database resides on the public cloud computing system, and the source database resides on an on-premise computing system.

12. The method of claim 11, wherein the computing environment comprises a virtual machine operating on the memory, a network interface and the one or more processors of the public cloud computing system, and the virtual machine is configured to run a Java batch program for executing the method of claim 11.

13. The method of claim 10, further comprising:
detecting a plurality of source tables in the source database;
creating a plurality of data migration threads respectively corresponding to the plurality of source tables for transferring the data to a plurality of target tables in the target database; and,
prior to executing each of the plurality of data migration threads, automatically determining for each of the plurality of source tables if there is at least a given source data field in a given source table that has a different data type compared to a corresponding given target data field in a corresponding given target table.

14. The method of claim 13, wherein the plurality of data migration threads are executed in parallel to simultaneously transfer the data from the plurality of source tables to the plurality of target tables.

15. The method of claim 10, wherein the computing environment is part of an on-premise computing system, the target database resides on the on-premise computing system, and the source database resides on the on-premise computing system.

16. The method of claim 10, wherein the memory stores thereon a scheduled date, and the method further comprising automatically migrating the data from the source database, including the converted data, to the target database on the scheduled date.

17. The method of claim 10, wherein the first data type is a first data format, and the second data type is a second data format; and wherein the method further comprising:
automatically detecting that the first data format is not supported by the second target database; and
automatically converting the first data format to the second data format according to according to the conversion rule.

18. A non-transitory computer readable medium storing computer executable instructions which, when executed by at least one computer processor, cause the at least one computer processor to carry out a method migrating data, the method comprising:
storing in the memory an encrypted database vault, the encrypted database vault storing in an encrypted format at least a source user ID and a source password for accessing a source database, and a target user ID and a target password for accessing a target database;
receiving a command to migrate data from the source database to a target database;
responsive to receiving the command, accessing the encrypted database vault to use the source user ID and the source password to access the source database, and to use the target user ID and the target password to access the target database, and then automatically determining if a first data type of a source data field in the source database, which is to be migrated to a target data field in the target database, is different or the same as a second data type of the target data field;

responsive to automatically detecting the first data type is different from the second data type, automatically searching a rules database in the memory for a conversion rule in relation to the first data type and the second data type;

after obtaining the conversion rule, automatically executing the conversion rule to convert data in the source data field to converted data that is of the second data type; and, after automatically executing the conversion rule, automatically migrating the data from the source database, including the converted data, to the target database.

* * * * *